United States Patent
Ando et al.

(10) Patent No.: US 9,266,210 B2
(45) Date of Patent: Feb. 23, 2016

(54) WORK MACHINING METHOD

(75) Inventors: Yosuke Ando, Kitasaku-gun (JP);
Satoru Akimoto, Kitasaku-gun (JP);
Hitoshi Matsumoto, Kitasaku-gun (JP);
Umeo Tsuyusaki, Kitasaku-gun (JP);
Hiroshi Kasuya, Kitasaku-gun (JP);
Shinji Mukota, Kariya (JP); Toru Nitta,
Kariya (JP)

(73) Assignee: CITIZEN MACHINERY CO., LTD., Nagano (JP)

( * ) Notice: Subject to any disclaimer, the term of this patent is extended or adjusted under 35 U.S.C. 154(b) by 1278 days.

(21) Appl. No.: 12/737,357

(22) PCT Filed: Jul. 6, 2009

(86) PCT No.: PCT/JP2009/062303
§ 371 (c)(1),
(2), (4) Date: Feb. 17, 2011

(87) PCT Pub. No.: WO2010/004961
PCT Pub. Date: Jan. 14, 2010

(65) Prior Publication Data
US 2011/0158775 A1    Jun. 30, 2011

(30) Foreign Application Priority Data

Jul. 10, 2008 (JP) ................................. 2008-179912
Oct. 17, 2008 (JP) ................................. 2008-269110

(51) Int. Cl.
*B23P 23/02* (2006.01)
*B23B 11/00* (2006.01)
(Continued)

(52) U.S. Cl.
CPC ................. *B23Q 39/028* (2013.01); *B23B 1/00* (2013.01); *B23B 3/168* (2013.01); *B23B 3/30* (2013.01);
(Continued)

(58) Field of Classification Search
CPC ............ B23B 13/04; B23B 3/32; B23B 3/30; B23Q 2039/002; B23Q 2039/006; B23Q 39/048; B23Q 7/007; Y10T 29/5126; Y10T 82/2524; Y10T 82/2502; Y10T 82/2506; Y10T 82/2508; Y10T 82/2514; Y10T 82/10
USPC ............ 29/37 A; 82/129, 118, 120, 121, 124, 82/1.11
See application file for complete search history.

(56) References Cited

U.S. PATENT DOCUMENTS 5,088,361 A * 2/1992 Kojima et al. ................. 29/27 R
5,117,544 A   6/1992 Kousaku et al.
(Continued)

FOREIGN PATENT DOCUMENTS

CN    1258587 A    7/2000
CN    1385270 A   12/2002
(Continued)

OTHER PUBLICATIONS (by) Andersen, from Quality Progress, "Process Cycle Time Reduction: A Back-to-Basics Look at Removing Bottlenecks", Jul. 1999, two pages.*
European Patent Office, "Extended European Search Report for EP 09794405.2", Jun. 13, 2013.
Taiwan Patent Office, "Office Action for TW 098123483," Jan. 19, 2015.

*Primary Examiner* — Erica E Cadugan
(74) *Attorney, Agent, or Firm* — Manabu Kanesaka

(57) ABSTRACT

A method for machining a work in a work machining apparatus provided with a movable main spindle moving between a work supply position and a work take-out position, includes arranging a tool rest on the movable main spindle to move integrally with the movable main spindle, supplying the work at the work supply position to the movable main spindle, moving the movable main spindle from the work supply position toward the work take-out position, machining the work held on the movable spindle with a tool of the tool rest while moving the movable main spindle from the work supply position toward the work take-out position, and taking out the work at the work take-out position from the movable main spindle.

6 Claims, 10 Drawing Sheets

(51) Int. Cl.
   *B23B 1/00* (2006.01)
   *B23B 3/30* (2006.01)
   *B23B 13/04* (2006.01)
   *B23Q 39/04* (2006.01)
   *B23Q 39/02* (2006.01)
   *B23B 3/16* (2006.01)
   *B23B 3/36* (2006.01)
   *B23Q 1/01* (2006.01)
   B23Q 39/00 (2006.01)
   B23B 3/06 (2006.01)

(52) U.S. Cl.
   CPC . *B23B 3/36* (2013.01); *B23B 13/04* (2013.01); *B23Q 1/015* (2013.01); *B23Q 39/048* (2013.01); *B23B 3/065* (2013.01); *B23Q 39/025* (2013.01); *B23Q 2039/006* (2013.01); *B23Q 2039/008* (2013.01); *Y10T 29/5107* (2015.01); *Y10T 29/5114* (2015.01); *Y10T 82/2506* (2015.01); *Y10T 82/2514* (2015.01); *Y10T 82/2524* (2015.01)

(56) References Cited

U.S. PATENT DOCUMENTS

| | | | |
|---|---|---|---|
| 5,270,941 A | 12/1993 | Hanaki et al. | |
| 6,357,324 B1 | 3/2002 | Zackrisson et al. | |
| 8,875,604 B2 * | 11/2014 | Tsuyusaki et al. | 82/121 |
| 2002/0162431 A1 * | 11/2002 | Schuettel et al. | 82/120 |
| 2004/0211301 A1 * | 10/2004 | Kobayashi et al. | 82/129 |
| 2008/0012519 A1 | 1/2008 | Ozawa et al. | |

FOREIGN PATENT DOCUMENTS

| | | |
|---|---|---|
| CN | 1903505 A | 1/2007 |
| EP | 0374259 B1 | 10/1995 |
| EP | 1 275 454 A1 | 1/2003 |
| JP | H03225505 A | 10/1991 |
| JP | H04-193401 A | 7/1992 |
| JP | H07-88701 | 4/1995 |
| JP | 2008-36763 | 2/2008 |
| TW | 200800473 A | 1/2008 |

* cited by examiner (a)

(b)

(a)

(b)

WORK MACHINING METHOD

RELATED APPLICATIONS

The present application is National Phase of International Application No. PCT/JP2009/062303 filed Jul. 6, 2009, and claims priorities from Japanese Applications No. 2008-179912 filed Jul. 10, 2008; and No. 2008-269110 filed Oct. 17, 2008, the disclosure of which is hereby incorporated by reference herein in its entirety.

TECHNICAL FIELD

The present invention relates to a work machining method.

BACKGROUND ART

Conventionally, a work machining apparatus is known in which it is provided with three main spindles, i.e. a first main spindle, a second main spindle and a third main spindle, and the second main spindle is arranged such that it is opposed to the first and third main spindles, and a work can be transferred between the first main spindle and the second main spindle, and between the second main spindle and the third main spindle, whereby a work is sequentially transferred in the order of the first main spindle, the second main spindle and the third main spindle, thereby to enable continuous machining (see Patent Document 1).
Patent Document 1: JP-A-2008-36763

SUMMARY OF THE INVENTION

Problems to be Solved by the Invention

However, in the work machining apparatus disclosed in Patent Document 1, after a work is machined in the third main spindle and the work thus machined is taken out, stand-by is required until machining in the second main spindle is finished and the second main spindle moves to a position which is opposed to the third main spindle. As a result, the stand-by time of the third main spindle is prolonged, resulting in lowering in operation ratio of the work machining apparatus.

The present invention has been made in view of the above-mentioned problems, and an object thereof is to provide a work machining apparatus which conveys a work by a movable main spindle which moves between a supply position and a take-out position, and can process a work with a high efficiency, and a work machining method.

Means for Solving Problems

In order to solve the above-mentioned problems, the work machining apparatus of the present invention has a structure in which it is provided with a movable spindle which moves forward and backward between a work supply position and a work take-out position, in which a work is supplied to the movable main spindle at the supply position, the movable main spindle is moved from the supply position to the take-out position, and by taking the work out from the movable main spindle at the take-out position, thereby to convey the work from the supply position to the take-out position, wherein a tool rest corresponding to the movable main spindle is integrally and movably attached to the movable main spindle; and the tool rest is configured such that it processes a work held on the movable main spindle by a tool of the tool rest during the conveyance of the work by the movable main spindle. The work machining apparatus may be configured such that a work conveyance apparatus is arranged at least one of the work supply position or the work take-out position, and the work is transferred between the movable main spindle and the work conveyance apparatus at least one of the work supply position and the work take-out position.

Due to such a structure, since the movable main spindle reaches the work-takeout position while machining, integrally with the tool rest, a work which has been received by the movable main spindle at the work supply position, wasteful stand-by time can be eliminated.

The work machining apparatus may have a structure in which a main spindle is arranged in each of the work supply position and the work take-out position, and at the work supply position and the work take-out position, transfer of the work is conducted between the main spindle and the movable main spindle. Due to such a structure, it becomes possible to examine a work which has already been machined in the movable main spindle can be examined or the like by other main spindles while machining a work by the movable spindle while transferring the work to other main spindles.

In this case, a tool rest provided with a tool for machining a work held on the above-mentioned main spindle can be provided in correspondence with each of the main spindles.

As a result, a work held on each main spindle can be machined by means of a tool provided in correspondence with each main spindle. Then, a work which has been machined by the main spindle at the work supply position side can be transferred to the movable main spindle at the work supply position, can be conveyed while being machined by the movable main spindle, can be transferred to the main spindle of the work take-out position, and can be subjected to further machining.

Further, since the work machining time in the main spindle at the work take-out position is longer than the work machining time in the movable main spindle, it becomes possible to conduct machining of a work in the movable main spindle utilizing the stand-by time of the movable spindle, whereby a waste time can be further shortened.

The method of the present invention is a method for machining a work in a work machining apparatus provided with a movable spindle which moves forward and backward between a work supply position and a work take-out position, in which a work is supplied to the movable main spindle at the supply position, the movable main spindle is moved from the supply position to the take-out position, and the work is taken out from the movable main spindle at the take-out position, thereby to convey the work from the supply position to the take-out position which comprises: preparing a tool rest which is provided in the movable main spindle and moves integrally with the movable main spindle, and, while moving relative to the movable spindle, processes a work held on the movable spindle; and machining the work held on the movable spindle by means of a tool of the tool rest during the conveyance and movement of the work by the movable spindle.

A work conveyance apparatus may be prepared at least one of the work supply position and the work take-out position, and transfer of the work may be conducted between the movable main spindle and the work conveyance apparatus at least one of the work supply position and the work take-out position.

The method of the present invention may be a method in which a main spindle which is arranged at each of the work supply position and the work take-out position and conducts transfer of a work with the movable spindle is prepared, the work is machined while moving it by the movable spindle, and the work thus machined is transferred to the main spindle at the work take-out position. In this case, a tool rest may be provided in correspondence with each of the main spindles, after a work which is held on the main spindle is machined by a tool attached on the tool rest, the work may be transferred from the main spindle to the movable main spindle at the work take-out position, and the work which has been transferred from the movable main spindle to the main spindle is machined at the work take-out position by means of a tool attached on the tool rest.

Advantageous Effects of the Invention

In the present invention, due to the above-mentioned structure, the movable main spindle and the tool rest can integrally process a work while moving from the work supply position to the work take-out position, and can immediately transfer the machined work to another main spindle, the work take-out apparatus or the like at the work-take out position. As a result, the stand-by time can be shortened to increase the operation rate of the work machining apparatus.

BEST MODE FOR CARRYING OUT THE INVENTION

Figure 1:
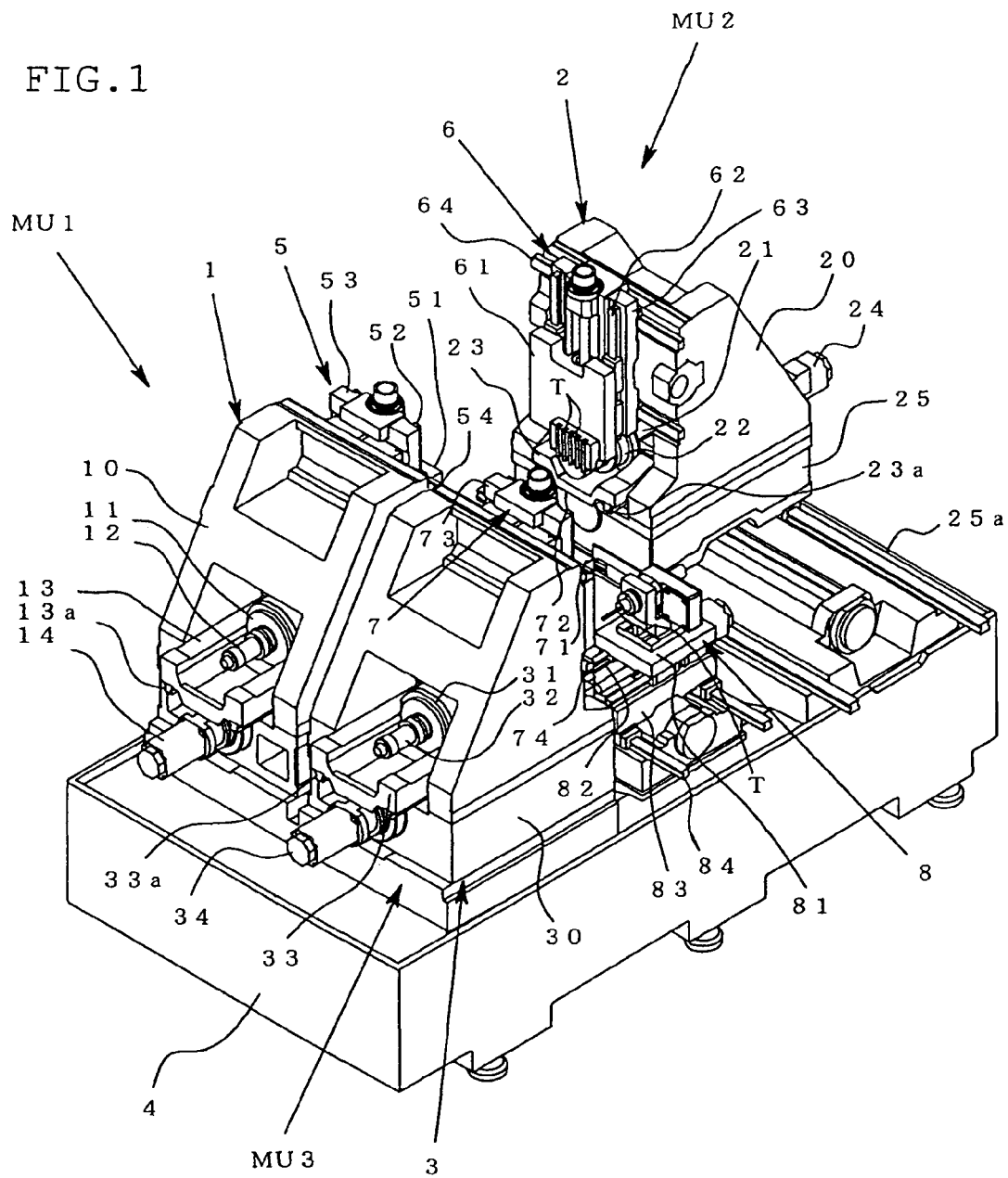
FIG. 1 relates to one embodiment of the work machining apparatus of the present invention, and shows a perspective view for explaining the entire structure of the work machining apparatus of one embodiment of the present invention.
Figure 2:
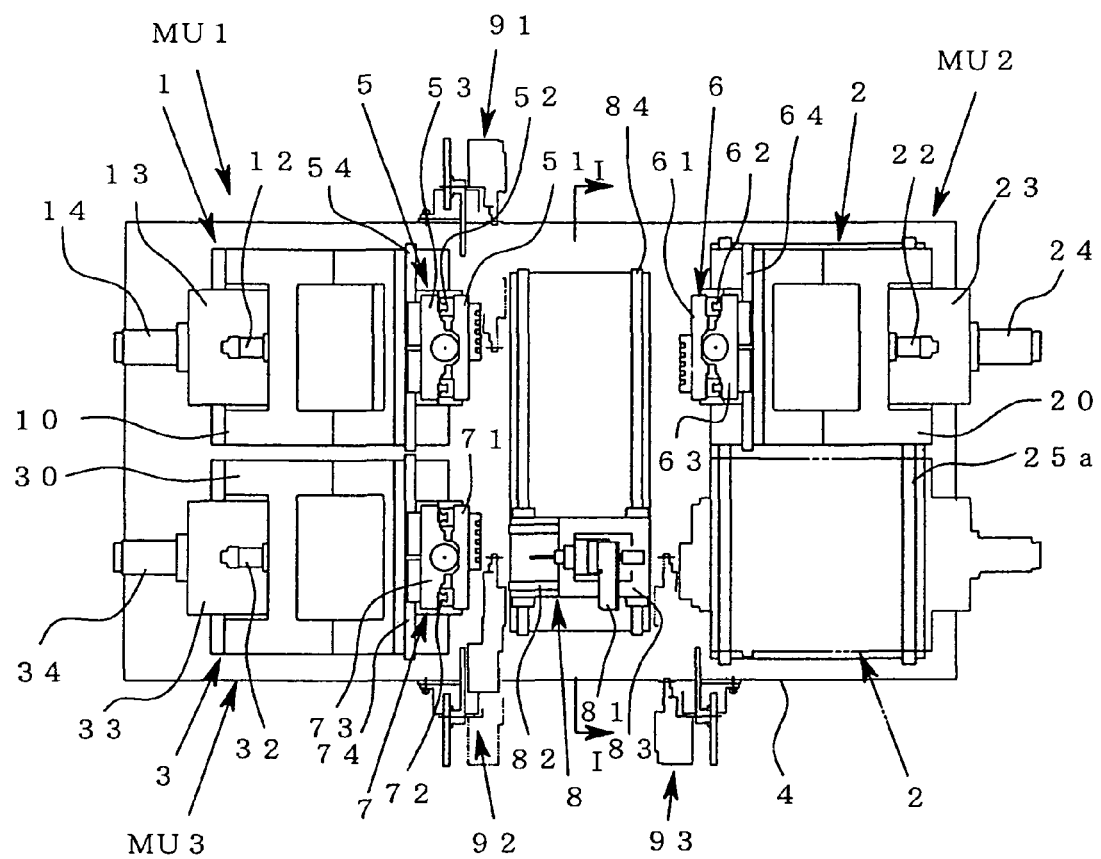
FIG. 2 is a plan view of the work machining apparatus in FIG. 1.
Figure 2:
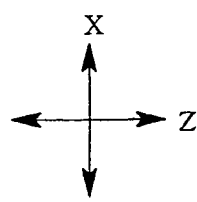
Figure 3:
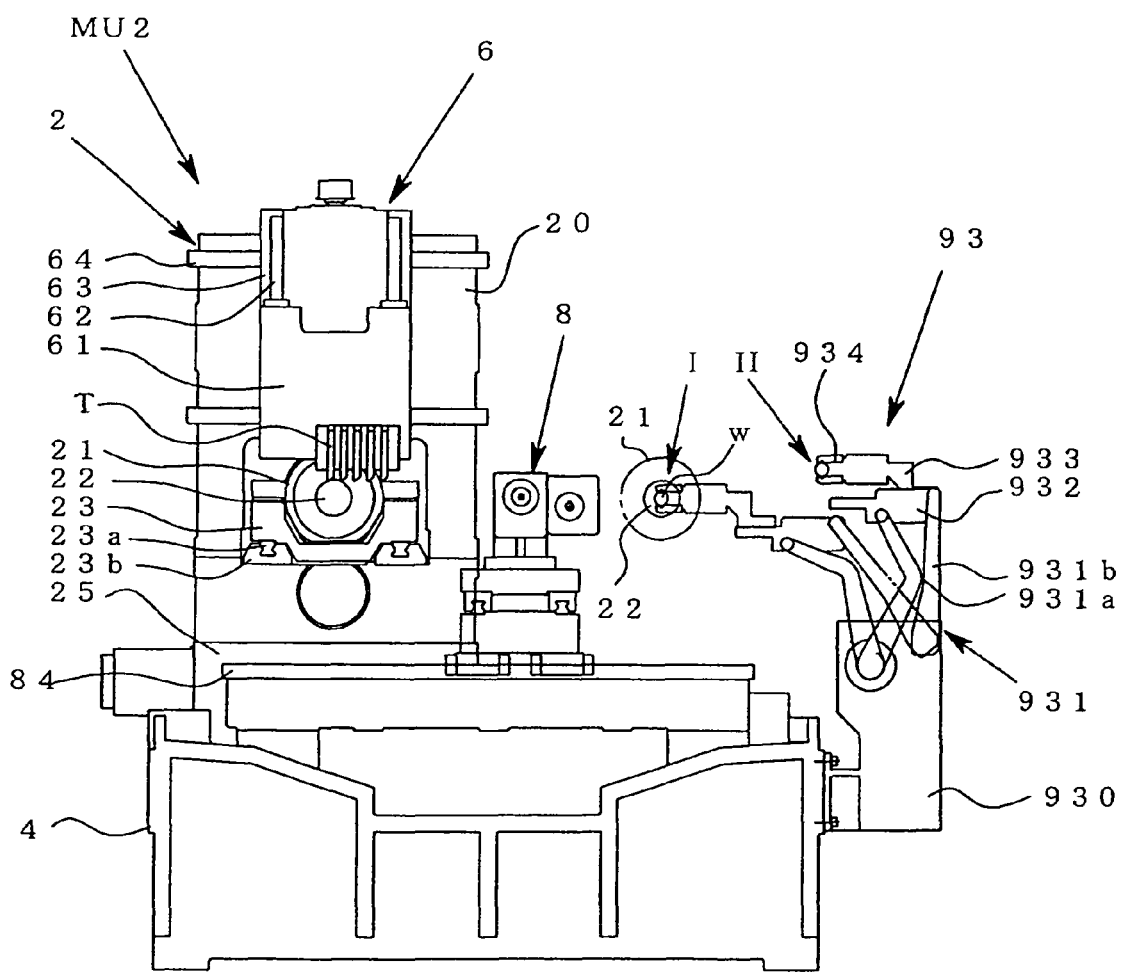
FIG. 3 is a fragmentary view (partial cross-sectional view) taken in the direction of an I-I arrow in FIG. 2.
Figure 3:
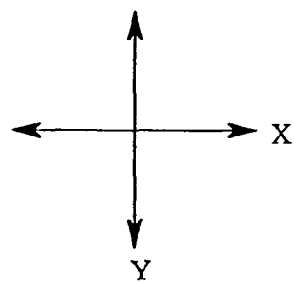

FIG. 1 relates to one embodiment of the work machining apparatus of the present invention, and shows a perspective view for explaining the entire structure of the work machining apparatus of one embodiment of the present invention. FIG. 2 is a plan view of the work machining apparatus in FIG. 1, and FIG. 3 is a fragmentary view (partial cross-sectional view) taken in the direction of an I-I arrow in FIG. 2.

In this embodiment, the first main head stock 1 provided on the upper surface of a bed 4 of the work machining apparatus is provided with a main spindle head 11, a movable table 13 and a base table 10. The main spindle head 11 supports the first main spindle 12 in such a manner that the main spindle can freely conduct rotational driving. The main spindle head 11 is provided with a built-in motor which allows the first main spindle 12 to rotate with the axial core thereof being as the center of rotation. At the front end of the first main spindle 12, a chuck for holding a work is provided. The movable table 13 supports the main spindle head 11. On the bottom surface of the movable table 13, a Z-direction guide 13a, which is laid in the Z direction which is in parallel with the main spindle axial line, is integrally fixed.

On the base table 10, a carriage (not shown) to be slidably attached to the Z-direction guide 13a is fixed. Due to the movement of the Z-direction guide 13a in the Z-direction relative to the carriage, the movable table 13 moves forward and backward in the Z direction relative to the base table 10. A motor 14 which allows to the movable table 13 to move forward and backward in the Z direction is integrally attached on the base table 10. Due to the movement of the movable table 13 by the driving of the motor 14, the first main spindle 12 moves forward and backward integrally with the main spindle head 11.

Above the front end of the main spindle 12 of the first main head stock 1, a Y-direction guide 54 is laid in the Y-direction which orthogonally crosses the axial line of the main spindle in a horizontal plane. The Y-direction guide 54 is provided with a saddle 53 such that it can move forward and backward freely. An X-direction guide 52 is laid on the saddle 53 in the direction which is an up-down-direction orthogonally crossing the Y direction and the Z direction. The X-direction guide 52 is provided with a tool rest main body 51 such that it can move forward and backward freely. By the above-mentioned saddle 53 and the tool rest main body 51, the first tool rest 5 corresponding to the first main spindle 12 is constituted. As mentioned above, the first tool rest 5 is integrally provided on the first head stock 1 such that it can be moved freely in the Y direction and the X direction. In this embodiment, the tool rest main body 51 is composed of a comb-like tool rest obtained by arranging in the Y-direction a plurality of tools for machining a work.

By moving the tool rest main body 51 in the Y direction, from a plurality of tools Y attached on the first tool rest 5, a tool used for machining can be positioned. Due to the move of the first tool rest 5 in the Y direction and the X direction and the move of the first main spindle 12 in the Z direction, a work held by a chuck and held on the first main spindle 12 can be machined by the tool thus positioned.

As mentioned above, on the first main head stock 1, the first main spindle 12 which can move forward and backward freely and the first tool rest 5 which can be moved freely in the Y direction and the X direction are integrally provided, whereby a first machining unit MU1 is constituted. The first machining unit MU1 independently processes a work held on the first main spindle 12.

Since the Z direction guide 13a is integrally fixed to the bottom surface of the movable table 13, the Z-direction guide 13a moves relative to a base table 10a integrally with the movable table 13, and as a result, cutting scraps generated during the machining of a work can be prevented from being scattered in the Z-direction guide 13a. Therefore, provision of a cover or the like for preventing scattering of cutting scraps in the Z-direction guide 13a is not required, whereby the size thereof in the Z-direction can be suppressed.

As in the case of the above-mentioned first main head stock 1, the second main head stock 2 and the third main head stock 3 provided on the upper surface of the bed 4 each have a base table 20, a base table 30, the second main spindle 22 and the main spindle head 21, the third main spindle 32 and the main spindle head 31, the movable tables 23, 33, the Z-direction guides 23a and 33a, a carriage (shown by numeral 23b in FIG. 3 as for the carriage of the second main head stock 2), and motors 24 and 34. Due to the movement of the movable tables 23 and 33 by the driving of the motors 24 and 34, the second main spindle 22 and the third main spindle 32 moves forward and backward in the Z direction.

Further, as in the case of the above-mentioned first tool rest 5, the second tool rest 6 corresponding to the second main spindle 22 and the third tool rest 7 corresponding to the third main spindle 32 are each composed of saddles 63 and 73 which move forward and backward in the Y direction while being guided by the Y-direction guides 64 and 74 and tool rest main bodies 61 and 71 which move up and down while being guided by the X-direction guides 62 and 72, and are integrally provided on the second main spindle 2 and the third main spindle 3 such that they can move freely in the Y direction and the X direction.

Due to the above-mentioned structure of the second main head stock 2 and the third main head stock 3, the second machining unit MU2 and the third machining unit MU3 are configured as in the case of the above-mentioned first machining unit MU1.

Due to the second machining unit MU2 and the third machining unit MU3, a work which is held by the chuck and held on the second main spindle 22 and a work which is held by the chuck and held on the third main spindle 32 can be independently and separately machined by means of a tool attached on the tool rest main body 61 and the tool rest main body 71. The tool used for machining can be positioned by moving the tool rest main body 61 and the tool rest main body 71 in the Y-direction.

The above-mentioned three machining units MU1, MU2 and MU3 have the same structure.

As for the first machining unit MU1 and the third machining unit MU3, the base tables 10 and 30 are fixed to the bed 4 in such a manner that they are adjacent to each other, thereby to cause the main spindle axial line of the first main spindle 12 and the main spindle axial line of the third main spindle 32 become parallel.

On the upper surface of the bed 4, on the position opposing to the first machining unit MU1 and the third machining unit MU3, the Y-direction guide 25a is laid in the Y direction. A saddle 25 is provided on the Y-direction guide 25a such that it can move forward and backward freely. As for the second machining unit MU2, the base table 20 thereof is fixed to the saddle 25 such that the main spindle axial line of the second main spindle 22 becomes in parallel with the main spindle axial line of the first main spindle 12 and the main spindle axial line of the third main spindle 32. Accordingly, the second main spindle 22 can move forward and backward freely in the Y-direction together with the second machining unit MU2. The second machining unit MU2 is arranged on the side opposite to the first machining unit MU1 and the third machining unit MU3 such that the front end of the second main spindle 22 is opposed to the front ends of the first main spindle 12 and the second main spindle 32. In this embodiment, the second main spindle 22 constitutes the "movable spindle".

For this reason, due to the movement of the second spindle 22 in the Y direction, the second main spindle 22 can be opposed to the first main spindle 12 or the third main spindle 32 on the same main spindle axial line. By positioning the first main spindle 12 and the second main spindle 22 such that they oppose to each other, and by moving the first main spindle 12 and the second main spindle 22 in the Z direction by means of the movable tables 13 and 23 such that they close to each other, a work can be transferred between the first main spindle 12 and the second main spindle 22.

Similarly, by positioning the second main spindle 22 and the third main spindle 32 such that they oppose to each other, and by moving in the Z direction the second main spindle 22 and the third main spindle 32 by means of the movable tables 23 and 33 such that they close to each other, work transfer becomes possible between the third main spindle 32 and the second main spindle 22.

As mentioned above, since the entire second machining unit MU2 moves in the Y direction, during the movement in the Y-direction, the second machining unit MU2 can independently conduct machining of a work held on the second main spindle 22 during the movement in the Y-direction.

Between the first and third machining units MU1 and MU3 and the second machining unit MU2, a Y-direction guide 84 is laid on the bed 4 in the Y-direction. A saddle 83 is attached to the Y-direction guide 84 such that it can move forward and backward freely. On the upper surface of the saddle 83, a Z-direction guide 82 is laid in the Z direction. A tool rest main body 81 is attached to the Z-direction guide 82 such that it can move forward and backward freely. The saddle 83 and the tool rest main body 81 constitute the fourth tool rest 8.

The fourth tool rest 8 is positioned between the first machining unit MU1 and the third machining unit MU3, and the second machining unit MU2 such that it can move forward and backward freely, and a tool T for machining a work is held on a tool rest main body 81. The fourth tool rest 8 corresponds to any one of the first main spindle 12, the second main spindle 22 and the third main spindle 32 due to the movement thereof in the Y direction, and can process a work held on the main spindle by the movement in the Y direction and the relative movement in the Z direction with the corresponding main spindle. In the shown example, the tool T attached on the tool rest main body 81 is a drill (rotating tool) which directs to a work held on the first main spindle 12 or a work held on the third main spindle 32. It is also possible to attach a tool on the side which directs to a work held on the second main spindle 22. Further, a plurality of tools may be attached, and not only rotational tools but also cutting tools such as tool bits may be attached.

When the first main spindle 12, the second main spindle 22 and the third main spindle 32 move in the Z direction, in order to avoid interference of the Y-direction guide 84 and the movable tables 13, 23 and 33, and the main spindle heads 11, 21 and 31 and the first to third main spindles 12, 22 and 32, in the work machining apparatus, as shown in FIG. 3, the Y-direction guide 84 is provided at a position which is relatively lower than the Z-direction guides 13a, 23a and 33a of the machining units MU1, MU2 and MU3. As a result, the first and third main spindles 12 and 32 and the second main spindle 22, in the state where the first and third main spindles are arranged at opposite positions with the Y-direction guide 84 being sandwiched therebetween, can allow the first spindle 12, the second main spindle 22 and the third main spindle 32 to move forward and backward above the Y-direction guide 84 in the Z direction.

When a work is transferred between the first main spindle 12 and the second main spindle 22 and when a work is transferred between the second main spindle 22 and the third main spindle 32, the fourth tool rest 8 is retracted to a position where it does not interfere with the movable tables 13, 23, 33, the main axial heads 11, 21 and 31 and the first to the third main spindles 12, 22 and 32 (for example, a position shown by a virtual line in FIG. 3).

The movement in the Z direction of the first main spindle 12 of the first machining unit MU1, the movement in the X direction and the Y direction of the first tool rest 5, the movement in the Y direction of the saddle 25 of the second processing unit MU2, the movement in the Z direction of the second main spindle 22, the movement in the X direction and the Y direction of the second tool rest 6, the movement in the Z direction of the third main spindle 32 of the third machining unit MU3, the movement in the X direction and the Y direction of the third tool rest 7 and the movement in the Y direction and the Z direction of the fourth tool rest 8 is controlled by an NC apparatus.

Figure 4:
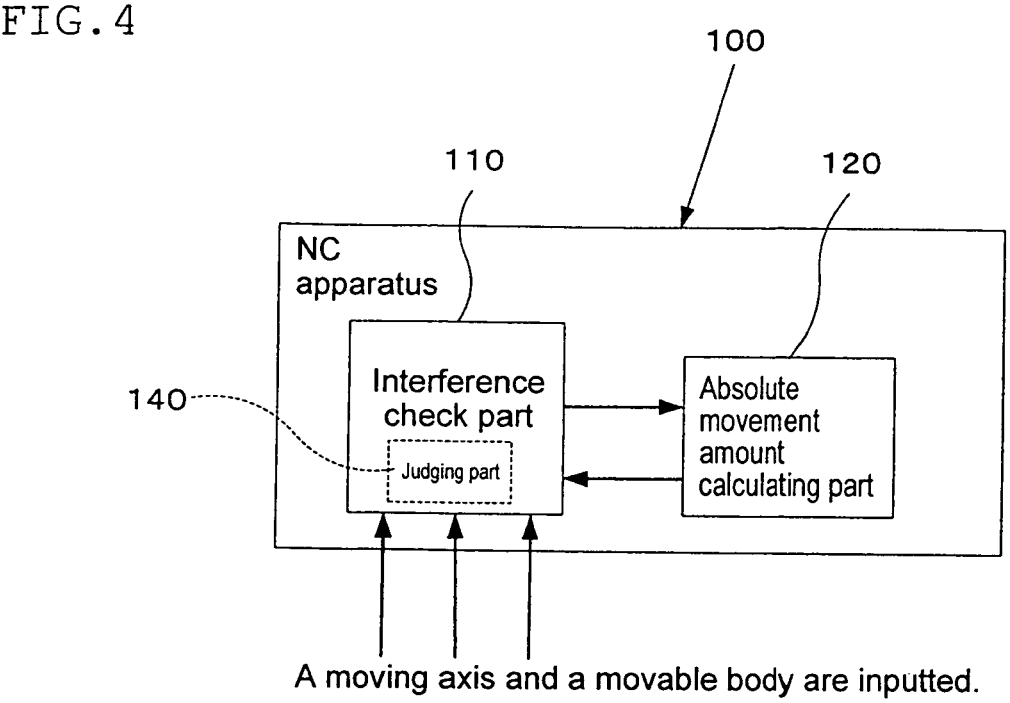
FIG. 4 is a schematic block diagram of essential parts of an NC apparatus.

FIG. 4 shows the structure of the NC apparatus. An NC apparatus 100 of this embodiment is provided with an interference check part 110 which checks interference which may occur when movable bodies such as the first main spindle 12 to the third main spindle 32 and the first tool rest 5 to the fourth tool rest 7 are moved. By inputting information about each of the movable bodies to the interference check part 110, interference of movable bodies themselves which may occur when each movable body moves for machining, etc., interference of a movable body with a fixed structure such as a machining apparatus is checked, whereby occurrence of interference can be detected.

Known methods can be used for interference check by the interference check part 110. In the interference check part 110, it is required to input a movable body for which interference is checked and to input and set the moving axis (i.e. the axis oriented to the moving direction) corresponding to the movement of the movable body in the X direction, the Y direction and the Z direction.

In the following description, if the moving axis of each movable body is described separately, the moving axis in the Z direction of the first main spindle 12 is referred to as the Z1 axis, the moving axes of the first tool rest 5 in the X direction and the Y direction are referred to as the X1 axis and the Y1 axis, respectively, the moving axis of the saddle 25 in the Y direction is referred to as the A2 axis, the moving axis of the second main spindle 22 in the Z direction is referred to as the Z2 axis, the moving axes of the second tool rest 6 in the X direction and the Y direction are referred to as the X2 axis and the Y2 axis, the moving axis of the third main spindle 32 in the Z direction is referred to as the Z3 axis, the moving axes of the third tool rest 7 in the X direction and the Y direction are referred to as the X3 axis and the Y3 axis, and the moving axis of the fourth tool rest 8 in the Y direction and the Z direction are referred to as the Y4 axis and the Z4 axis.

When interference of the first tool rest 5 and the fourth tool rest 8 is checked, the first tool rest 5 and the fourth tool rest 8 are inputted as the movable body to be checked for interference, for the first tool rest 5, the X1 axis is inputted as the moving axis in the X direction and the Y1 axis is inputted as the moving axis in the Y direction, and for the fourth tool rest 8, the Y4 axis is inputted as the moving axis in the Y direction and the Z4 axis is inputted as the moving axis in the Z4 axis.

In the interference check part 110, an absolute movement amount calculating part 120 is provided in association, which, when a plurality (two or more) of movable means are provided in one movable direction of one movable body as in the case of the second tool rest 6, synthesizes the amounts of movement in each of plurality of moving axes inputted for one movable direction of one movable body (the Y2 axis and the A2 axis in the second tool rest 6), and calculates the absolute movement amount of the movable body in the movable direction.

As shown in FIG. 4, the interference check part 110 may have a structure that, a judging part 140 is provided in the interference check part 110, and this judging part 140 judges that whether a plurality of moving axes for allowing one movable body to move in the same axial line direction are present among the plurality of moving axes thus inputted, and the absolute movement amount calculating part 120 synthesizes the amounts of the movement in the moving axis. The judging part 140 may be provided in the absolute movement calculating part 120 or may be provided separately from the interference check part 110 and the absolute movement amount calculating part 120.

In this embodiment, in the interference check part 110, if the second tool rest 6 is inputted as the movable body to be checked for interference, as the moving axis of the second tool rest 6 in the Y direction, the Y2 axis and the A2 axis can be inputted. In this embodiment, in the absolute amount calculating part 120, by synthesizing the amount of movement of the second tool rest 6 on the Y2 axis relative to the saddle 25 by means of the second tool rest 6 in the Y2 direction and the amount of movement of the saddle 25 on the A2 axis relative to the bed by the movable means for the saddle 25 in the A2 direction, a virtual moving axis (Y-direction virtual axis) of the second tool rest 6 relative to the bed 4 is formed, and the absolute amount of movement (the position on the coordinate) of the second tool rest 6 on the Y-direction virtual axis is obtained. Meanwhile, the absolute movement amount can be obtained in advance with a predetermined reference position of a machine tool, for example, the center of the end reference surface or the first main spindle 1, being as the reference.

When the movement amount of the second tool rest 6 on the virtual axis in the Y-direction obtained by the absolute amount calculating part 120 is inputted in the interference check part 110, interference of the second tool rest 6 with other movable bodies or with fixed structures or the like can be checked.

Figure 5:
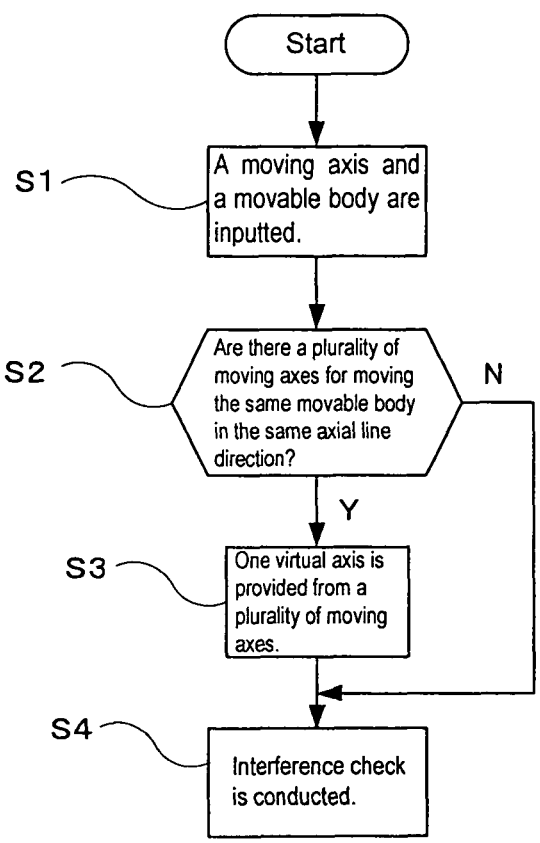
FIG. 5 is a flow chart for explaining one example of the action of the absolute movement amount calculating part and the interference check part.

One example of the action of the absolute movement amount calculating part 120 and the interference check part 110 will be explained with reference to FIG. 5.

In the step S1, a movable body to be checked for interference and the moving axis thereof are inputted in the interference check part 110. In this embodiment, since the second main spindle 22, the second tool rest 6 and the fourth tool rest 8 may interfere with each other, the moving axis of each of the second main spindle 22, the second tool rest 6 and the fourth tool rest 8 is inputted in the interference check part 110. At this time, the A2 axis is inputted as the Y-direction moving axis of the second main spindle 22, and the Y2 axis and the A2 axis are inputted as the Y-direction moving axis of the second tool rest 6. Further, since the first main spindle 12, the first tool rest 5 and the fourth tool rest 8 may interfere with each other, the moving axis of each of the first main spindle 12, the first tool rest 5 and the fourth tool rest 8 is inputted in the interference check part 110. Similarly, since the third main spindle 32, the third tool rest 7 and the fourth tool rest 8 may interfere with each other, the moving axis of the third main spindle 32, the third tool rest 7 and the fourth tool rest 8 is inputted in the interference check part 110.

Next, as shown in the step S2, judgment is conducted whether a plurality of moving axes are present for moving the same movable body in the same axial line direction. In the case where the judgment part 140 is provided, the judgment part 140 may be configured such that it can automatically conduct the above-mentioned judgment based on the above-mentioned inputted results. In addition, an operator may judge and input to the interference check part 110 so that the plurality of moving axes are inputted in the absolute movement amount calculating part 120 without providing the above-mentioned judging part 140. In this embodiment, since the Y2 axis and the A2 axis which have been inputted as the moving axes of the second tool rest 4 are in the same axial line direction, judgment is made that the Y2 axis and the A2 axis are present as a plurality of moving axes for moving the second tool rest 4 in the same direction.

In the step S2, if it is judged that a plurality of moving axes for moving the same movable body are present in the same axial line direction, as shown in the step S3, the absolute movement calculating part 120 provides one virtual axis from the plurality of moving axes. In this embodiment, in the absolute movement amount calculating part 120, from the Y2 axis and the A2 axis which are the moving axes of the second tool rest 4, a virtual Y-direction moving axis, i.e. the Y2' axis (Y-direction virtual axis), obtained by synthesizing the Y2 axis and the A2 axis, is provided. As a result, the two axes of the second tool rest 4, i.e., the A2 axis and the Y2 axis, are replaced by the Y2' axis, which is one Y-direction virtual axis, then the step S4 starts.

If judgment is made that a plurality of moving axes for moving the same movable body in the same axial direction are not present in step S2, the subsequent step S4 starts without providing a virtual axis. Then, in the step S4, the interference check part 110 conducts interference check from the amount of movement in each moving axis and the above-mentioned absolute movement amount in the virtual axis.

Figure 6:
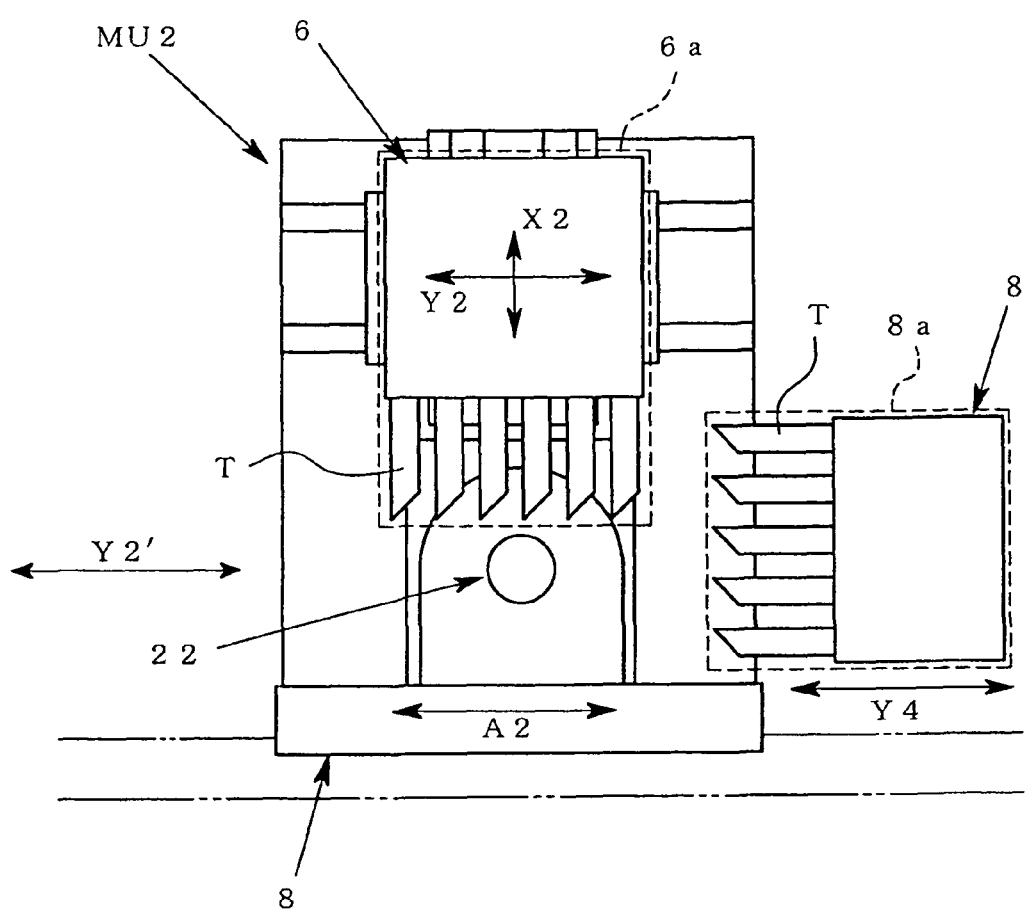
FIG. 6 is an explanatory view for explaining one example of interference check of the second tool rest for which a Y-direction virtual axis is set and the fourth tool rest.

FIG. 6 shows one example of interference check of the second tool rest 6 in which the Y2' axis, which is the Y-direction virtual axis, is set and the fourth tool rest 8. An interference check region (the region 6a surrounded by a dotted line) including the second tool rest 6 and the tool T attached thereon and an interference check region (the region 8a surrounded by a dotted line) including the fourth tool rest 8 and the tool T attached thereon. From the current positions of the second tool rest 6 and the fourth tool rest 8, based on the movement instructions in the X2 direction, the Y2 direction and the A2 direction for the second tool rest 6, determination is made on the position to which the second tool rest 6 moves on the Y2' axis and the X2 axis.

Further, based on instructions of moving in the Z4 direction and the Y4 direction for the fourth tool rest 8, determination is made on the position to which the fourth tool rest 8 moves on the Z4 axis and the Y4 axis. On the position of the both axes thus calculated, if the interference check region 6a of the second tool rest 6 and the interference check region 8a of the fourth tool rest 8 cross, the interference check part 110 judges that interference occurs between the second tool rest 6 and the fourth tool rest 8, controls the movement of the second tool rest 6 and the fourth tool rest 8, and warns by means of an alarm or the like that interference may occur.

In this way, according to the present invention, due to the association of the interference check part 110 and the absolute movement amount calculating part 120, interference check of the movable body can be easily conducted even when a plurality of moving means are provided in the same moving direction of one movable body.

In the work machining apparatus with the above-mentioned structure, a work conveyance apparatus may be provided with which an unfinished work is supplied to any one of the first main spindle 12, the second main spindle 22 and the third main spindle 32, and a finished work is taken out from any one of them.

As for the work conveyance apparatus, as far as a work can be transferred without interference between the first main spindle 12, the second main spindle 22 or the third main spindle 32, various work conveyance apparatuses such as a robot arm and a loader can be used.

In this embodiment, a work conveyance apparatus is provided corresponding to each of the first main spindle 12, the second main spindle 22 and the third main spindle 32. With reference to FIG. 3, an explanation is made on a work conveyance apparatus 93 which transfers a work with the second main spindle 22. Since the structure of a work conveyance apparatus 91 which transfers a work with the first main spindle 12 and a work conveyance apparatus 92 which transfers a work with the third main spindle 32 is the same as that of the above-mentioned work conveyance apparatus 93, a detailed explanation thereof is omitted.

The work conveyance apparatus 93 has a base table 930, a link mechanism 931, a base 932, a slider 933 and a chuck 934. The base table 930 is attached to the bed 4. The above-mentioned link mechanism 931 consists of a parallel link mechanism provided with a rotational arm 931a and a supporting arm 931b. The bottom end of the rotational arm 931a is rotatably supported by the base table 930. The bottom end of the supporting arm 931b is slidably supported by the base table 930.

The above-mentioned base 932 is supported by the front end of the rotational arm 931a and the supporting arm 931b. The rotation of the rotational arm 931a is conducted, for example, by a rotational cylinder. Due to the rotation of the rotational arm 931a, the base 932 moves forward and backward in parallel with the Y direction. The slider 933 is attached to the base 932 such that it can slide in the Y direction. Between the slider 933 and the base 932, a slide driving mechanism of the slider 933 is intervened. Due to the presence of the slide driving mechanism, the slider 933 moves forward and backward in the Y direction. The chuck 934 is provided at the front end of the slider 933 to hold a work.

The chuck 934 moves forward and backward in the Y direction in a two-step movement, i.e. the Y direction movement along the circular path of the base 932 by the rotation of the rotational arm 931a and the linear movement in the Y-direction of the slider 933 due to a slide driving mechanism. By allowing the chuck 934 to move such that it opposes to the front end of the second main spindle 22, a work can be transferred between the chuck 934 and the second main spindle 22. On the other hand, by directing the supporting arm 931b almost in the vertical direction and by allowing the slider 933 to move behind the base 932, it is possible to realize compact accommodation of the chuck 934 without allowing it to approximately protrude from the base 930.

Since the link mechanism 931 is formed of a parallel link mechanism, the work conveyance apparatus 93 can suppress the size in the height direction and the size in the Y direction in the above-mentioned accommodated state. The supply of an unfinished work to the chuck 934 can be conducted by a work supply apparatus such as a part feeder, which is not shown. Removal of the finished work from the chuck 934 can be conducted by a robot hand or the like, which is not shown.

[Method of Machining]

Next, with reference to FIGS. 7 and 8, one example of work machining using the work machining apparatus with the above-mentioned structure will be explained.

In the following, an explanation is made on the assumption that three work conveyance apparatuses 91, 92 and 93, i.e. a work conveyance apparatus 91 which can transfer a work with the first main spindle 12, a work conveyance apparatus 92 which can transfer a work with the third main spindle 32 and a work conveyance apparatus 93 which can transfer a work with the second main spindle 32 which is in the position opposing to the third main spindle 3 are provided.

In the initial stage shown in (a), a work W is held on the first main spindle 12 and the third main spindle 32, and the work is held on the first main spindle 12 and the third main spindle 32, the work held on the first main spindle 12 is machined by the tool T on the first tool rest 5, and the work W held on the third main spindle 32 is machined by the tool T on the third tool rest 7 and the tool T on the fourth tool rest 8. At this time, the second machining unit MU2 is in the stand-by state at a position which is opposed to the first machining unit MU1 such that the second main spindle 22 will be positioned on the main spindle axial line of the first main spindle 12. In the work conveyance apparatus 91, a work W which will be subsequently machined by the first machining unit MU1 is prepared.

When machining of the work W in the first machining unit MU1 is finished, the first main spindle 12 and the second main spindle 22 move in the Z direction in which they approach with each other, and as shown in (b), at a position almost middle of the first machining unit MU1 and the second machining unit MU2, the work W which has been machined by the first machining unit MU1, is transferred to the second main spindle 22.

After the completion of the transfer, as shown in (c), the first main spindle 12 restores to a position at which a work W to be machined next is received from the work conveyance apparatus 91. In the second machining unit MU2, the second main spindle 22 restores to a position at which a work W which has been received is machined. Machining of the work W by means of the tool T attached on the second tool rest 6 starts.

The second machining unit MU2, during the machining of the work W held on the second main spindle 22, in order to transfer the work to the third main spindle 32, moves for conveyance in the Y direction to a position opposing to the third main spindle 32. The timing at which the second processing unit MU2 is moved in the Y direction may be any of the followings: Simultaneously with or immediately after the second main spindle 22 restores to the machining position, before the machining, simultaneously with or immediately after the machining of the work W held on the third main spindle 32, immediately before or simultaneously with the transfer of the machined work W starts between the third main spindle 32 and the work conveyance apparatus 92.

At any timing, in order to reduce the wasteful time, when the finished work W is taken out from the third main spindle 32 by the work conveyance apparatus 92, it is desirable that the second main spindle 22 be positioned on the main spindle axial line of the third main spindle 32.

As shown in FIG. 8(a), when the second main spindle 22 and the third main spindle 32 are opposed on the main spindle axial line, machining of the work W is finished in the second main spindle 22, and the work W which has been machined by the third main spindle 32 is taken out by the work conveyance apparatus 92, then, as shown in FIG. 8(b), the second main spindle 22 and the third main spindle 32 move in a direction which they close to each other in the Z direction, and at a position which is almost the middle of the third machining unit MU3 and the second machining unit MU2, the work W which has been machined by the second main spindle 22 is transferred to the third main spindle 32. That is, in this embodiment, the first main spindle 12 constitutes the "main spindle" arranged at the "work supply position", and the third main spindle 32 constitutes the "main spindle" arranged at the "work take-out position".

When the work W is transferred from the second main spindle 23 to the third main spindle 33, the fourth tool rest 8 retracts to a position where it does not interfere with the second machining unit MU2 and the third machining unit MU3. For example, as shown in the figure, it retracts to a position which is almost middle between the first machining unit MU1 and the third machining unit MU3.

After the work W has been transferred from the second main spindle 23 to the third main spindle 33, as shown in FIG. 8(c), the third main spindle 32 restores to a work machining position where machining of the work W is conducted. Further, the second main spindle 22 restores to a position where movement in the Y direction is possible. Further, the fourth tool rest 8 is restored to a position at which it is opposed to the third main spindle 32. In the third machining unit MU3, machining of the work W starts by means of the tool T attached on the third tool rest 7 and the tool T attached on the fourth tool rest 8. The second machining unit MU2 moves in the Y-direction to a position at which it opposes to the first machining unit MU1, then it returns to the initial state (the state shown in FIG. 7(a)).

Thereafter, the procedure in FIG. 7(b) to FIG. 8(c) is repeated.

As mentioned above, since the second machining unit MU2 also serves as a work conveyance unit, and the work W can be conveyed while being machined by means of the second main spindle 22 from the first machining unit MU1 to the third machining unit MU3, there is no need to transfer the work W until machining of the work W in the second machining unit MU2 is finished. As a result, machining efficiency of the work is improved.

By mounting three machining units MU1, MU2 and MU3 on the single bed 4, it is easy to construct a work machining apparatus (machine tool) provided with a work conveyance system. Due to such a structure, less adverse influences are exerted by thermal displacement of a bed, displacement of a floor on which a bed is provided or the like on the work machining units MU1, MU2 and MU3, whereby machining accuracy can be improved. The layout of each of the machining units MU1, MU2 and MU3 can be modified according to the manner of the machining.

A structure is also possible in which the work which has been machined in the third machining unit MU3 is transferred from the third main spindle 32 to the second main spindle 22, the work which has been transferred to the second main spindle 22 is conveyed to the first main spindle 12 while being machined by the second machining unit MU2, thereby to transfer it to the first main spindle 12, whereby the work is machined by the first machining unit MU1 and taken out.

Figure 9:
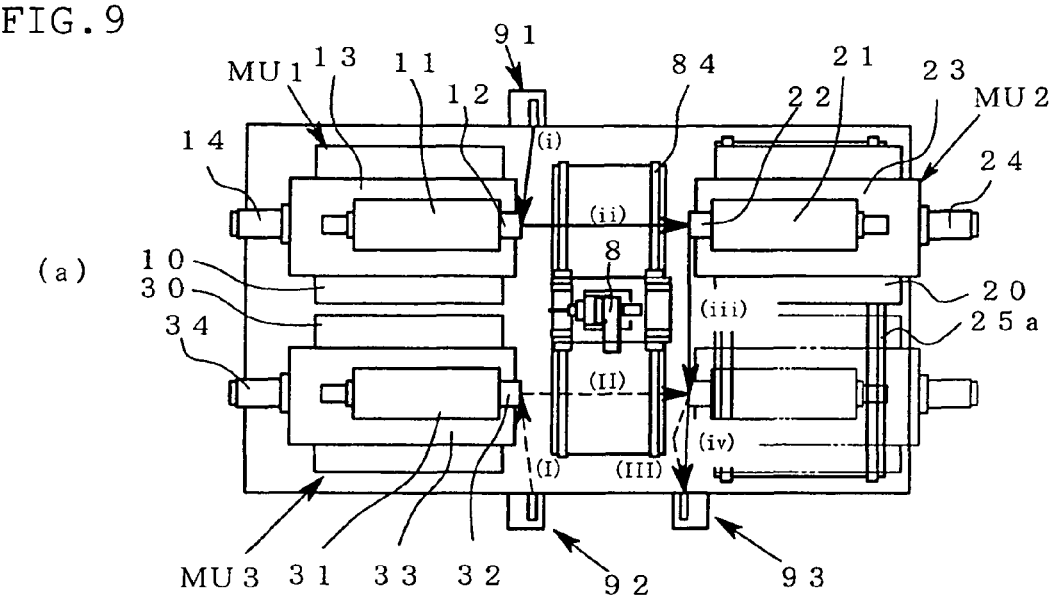
FIG. 9 is a schematic plan view for explaining another embodiment of the method for machining a work using the work machining apparatus according to the present invention.
Figure 9:
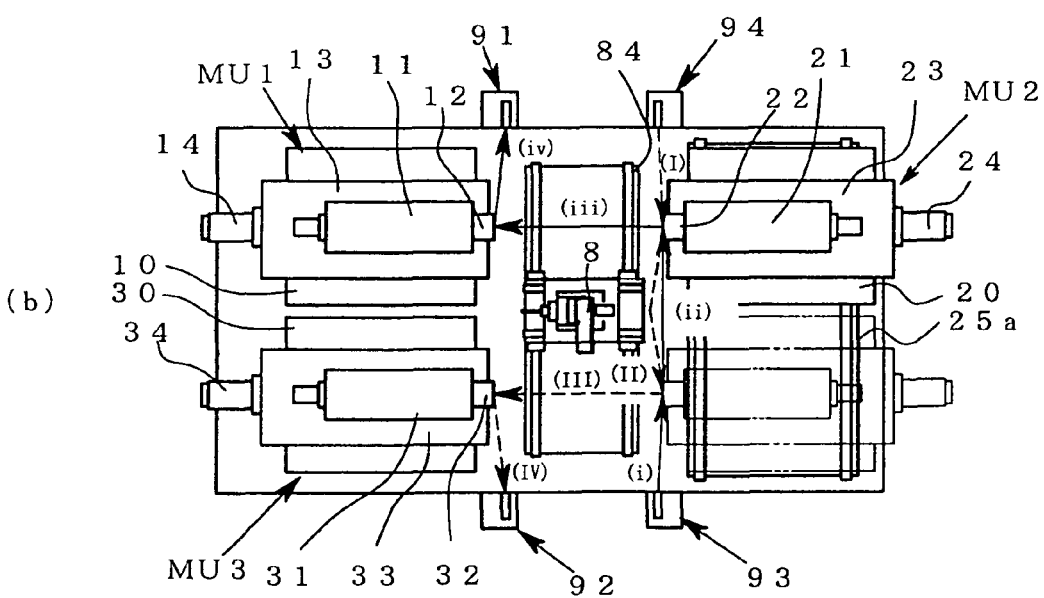
Figure 10:
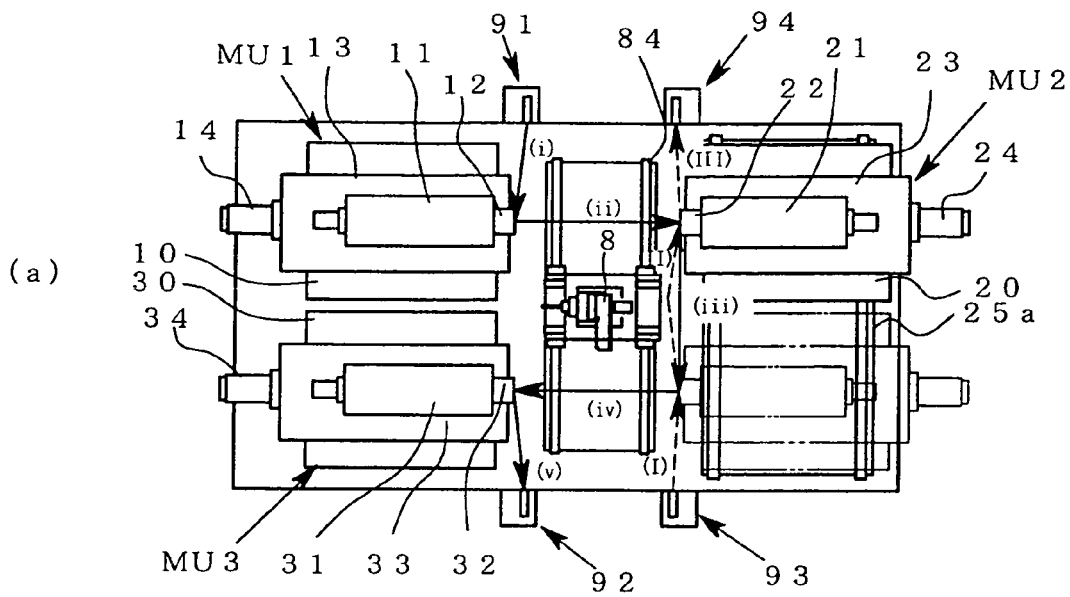
FIG. 10 is a schematic plan view for explaining still another embodiment of the method for machining a work using the work machining apparatus according to the present invention.
Figure 10:
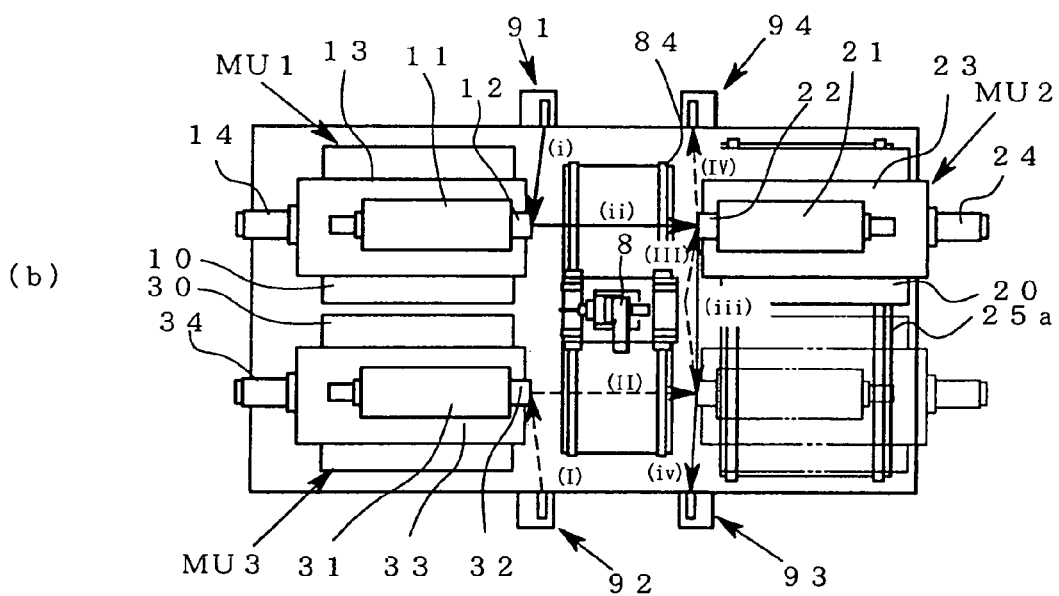

FIG. 9 and FIG. 10 each show the embodiment of other machining methods. In FIGS. 9 and 10, the flow of the work is shown by an arrow. The second machining unit MU2 at a position opposite to the third machining unit MU3 is shown by a virtual line.

In the example shown in FIG. 9(a), the first main spindle 12 receives an unfinished work from the work conveyance apparatus 91 (arrow (i)), and the work is machined by the tool attached on the first tool rest 5. The third main spindle 32 receives an unfinished work from the work conveyance apparatus 92 (dotted line arrow (I)), the work is machined by means of the tool attached on the third tool rest 7.

After the work machining by the first main spindle 12 is finished, in the same procedure as mentioned above, the second main spindle 22 receives the work which has been machined from the first main spindle 12 (arrow (ii)), machining of a work is conducted in the second machining unit MU2 while moving it in the Y direction (arrow (iii)). In the example shown in FIG. 9(a), the work which has been machined in the second machining unit MU2 is taken out from the second main spindle 22 by the work conveyance apparatus 93 at a position opposite to the third machining unit MU3 (arrow (iv)).

On the other hand, the work which has been machined in the third machining unit MU3 is transferred to the second main spindle 22 from which the machined work has been taken out by means of the work take-out apparatus 93 (dotted line arrow (II)). The work which has been transferred to the second main spindle 22 is machined by the second machining unit MU2, and then taken out by the work take-out apparatus 93 (dotted line arrow III)). Thereafter, the second machining unit MU2 restores to a position opposing to the first machining unit MU1, and returns to the initial state shown in FIG. 9(a).

In this example, the first main spindle 12 constitutes the "main spindle" arranged at the "work supply position", and the work conveyance apparatus 93 constitutes the "work conveyance apparatus" arranged at the "work take-out position".

In the example shown by FIG. 9(b), in order to allow a work to be taken in and out between the first machining unit MU1 and the second machining unit MU2, which is at a position opposing to the first machining unit MU1, on the side opposite to the work conveyance apparatus 93 in the Y-direction moving path of the second machining unit MU2, a fourth work conveyance apparatus 94 is provided.

In this example, an unfinished work (arrow (i)) which has been received from the work conveyance apparatus 93 at a position opposing to the third machining unit MU3 is machined while being moved by means of the second machining unit MU2 from a position opposing to the third machining unit MU3 to a position opposing to the first machining unit MU1 while moving in the Y direction (arrow (ii)), and the work which has been machined is transferred to the first main spindle 12 (arrow (iii)). The work which has been received from the second main spindle 22 is machined in the first machining unit MU1, and the work which has been machined is taken out by the work conveyance apparatus 91 (arrow (iv)).

Further, after the work is transferred from the second main spindle 22 to the first main spindle 12, at a position opposing to the first machining unit MU1, an unfinished work is transferred to the second main spindle 22 from the work conveyance apparatus 94 (dotted line arrow (I)). The second machining unit MU2 moves, while machining the received work, from a position opposing to the first machining unit MU1 to a position opposing to the third machining unit MU3 (dotted line arrow (II)).

The machined work is transferred from the second main spindle 22 to the third main spindle 32 (dotted line arrow (III)), and machining is conducted in the third machining unit MU3. The work which has been machined in the third machining unit MU3 is taken out by means of the work conveyance apparatus 92 (dotted line arrow (IV)).

In this example, the first main spindle 12 and the third main spindle 32 constitute the "main spindle" provided at the "work take-out position", and the work conveyance apparatuses 93 and 94 constitute the "work conveyance apparatus" provided at the "work supply position".

In the examples shown in FIGS. 10(a) and 10(b), in order to allow a work to be taken in and out between the first machining unit MU1 and the second machining unit MU2 which is at a position opposing to the first machining unit MU1, a fourth work take-out apparatus 94 is provided.

Figure 7:
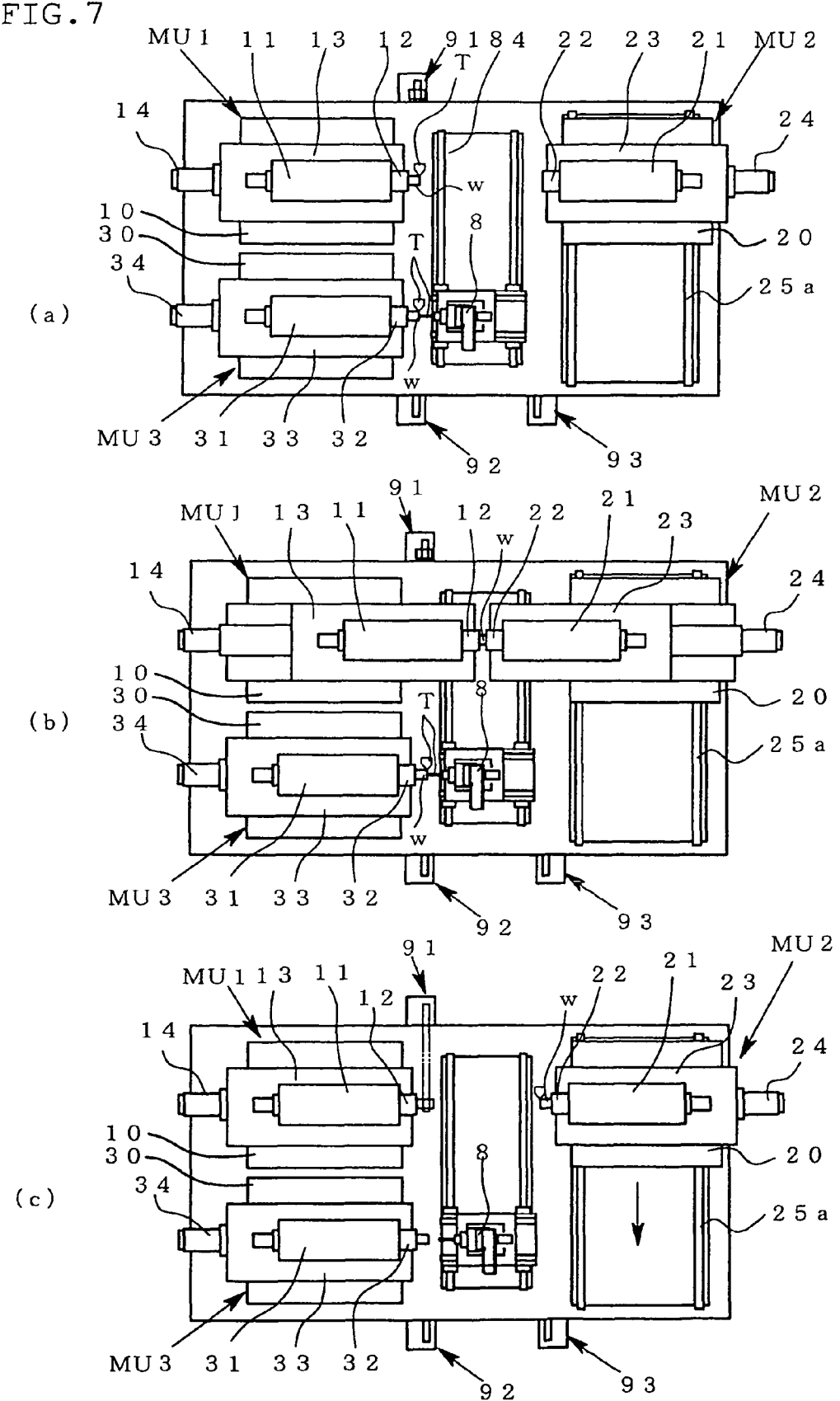
FIG. 7 relates to one embodiment of the method for machining a work using the work machining apparatus according to the present invention and shows a schematic plan view of the work machining apparatus.
Figure 8:
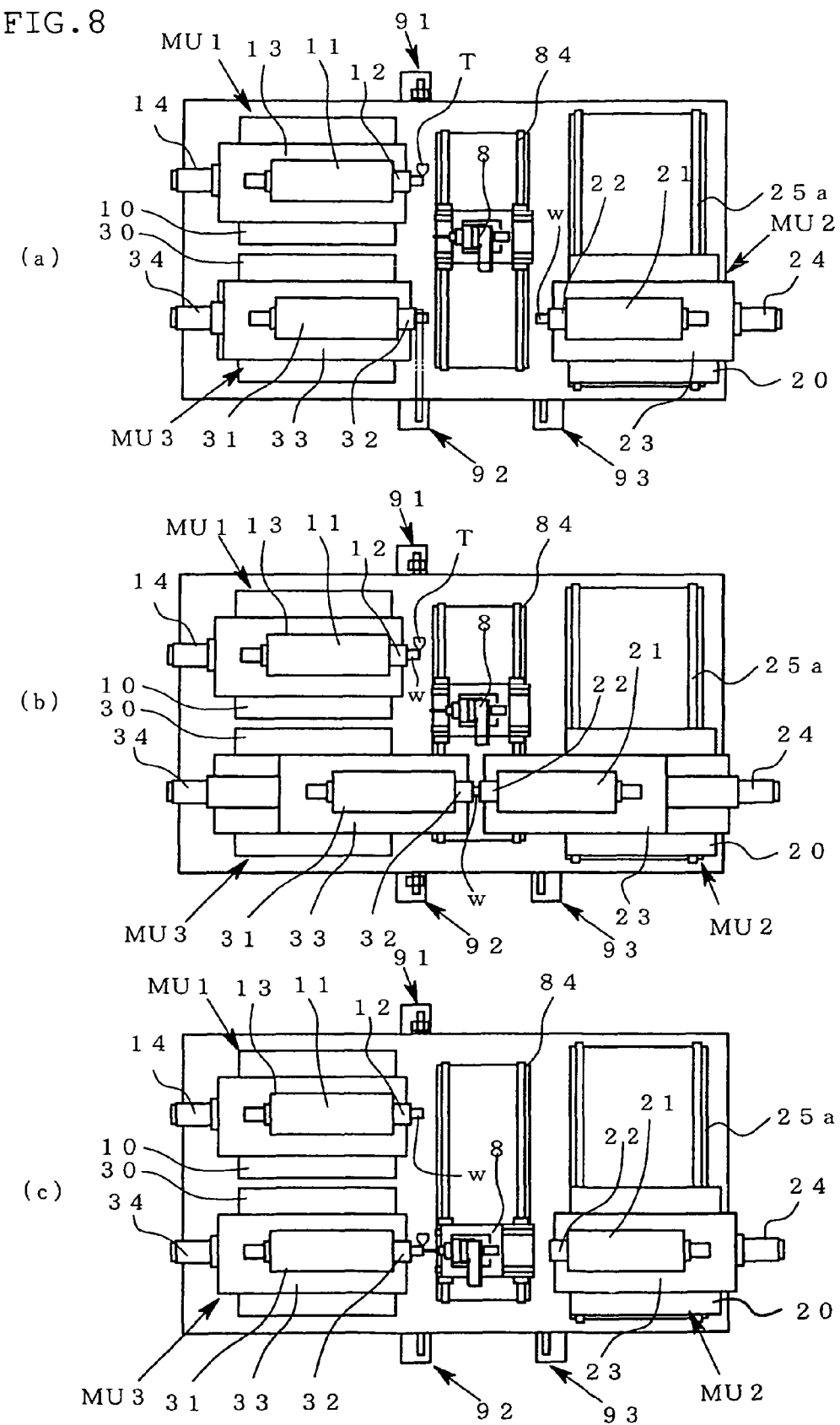
FIG. 8 relates to one embodiment of the method for machining a work using the work machining apparatus according to the present invention and shows a schematic plan view of the work machining apparatus.

In the example shown in FIG. 10(a), the flow of a work shown by the solid line arrow is the same as that shown in FIG. 7 and FIG. 8.

However, after a work is transferred from the second main spindle 22 to the third main spindle 32, an unfinished work is transferred to the second main spindle 22 from the work conveyance apparatus 93 (dotted line arrow (I)), and the second machining unit MU2 moves, while machining the received work, in the Y direction from a position opposing to the third machining unit MU3 to a position opposing to the first machining unit MU1 (dotted line arrow (II)). Then, the work which has been machined is transferred to the work conveyance apparatus 94 at a position corresponding to the first machining unit MU1 (dotted line arrow (III)). This example is effective in the case where the machining time of a work in the first machining unit MU1 is relatively long and the stand-by time of the second machining unit MU2 after a work is transferred to the third machining unit MU3 is long.

In this example, the first main spindle 12 constitutes the "main spindle" provided at the "work supply position" and the work conveyance apparatus 93 constitutes the "work conveyance apparatus" provided at the "work supply position". Further, the third main spindle 32 constitutes the "main spindle" provided at the "work take-out position" and the work conveyance apparatus 94 constitutes the "work conveyance apparatus" provided at the "work take-out position".

In the example shown in FIG. 10(b), the flow of a work (i) to (iv) shown by the solid line arrow and the flow of a work (I) to (II) shown by the dotted line arrow are the same as the flow of a work shown in FIG. 9(a).

However, in this example, after a work which has been machined by the third machining unit MU3 is transferred to the second main spindle 22, the second machining unit MU2 processes the work while moving in the Y direction from a position opposing to the third machining unit MU3 to a position opposing to the first machining unit MU1 (dotted line arrow III)). Then, the machined work is transferred from the second main spindle 22 to the work conveyance apparatus 94 (dotted line arrow (IV)).

In this example, the first main spindle 12 and the third main spindle 32 constitute the "main spindle" provided at the "work supply position" and the work conveyance apparatuses 93 and 94 constitute the "work conveyance apparatus" provided at the "work take-out position".

The present invention is by no means limited to the above-mentioned embodiments.

For example, during the conveyance of the work held on the second main spindle 22 by the second machining unit MU2, if a step for machining the work held on the second main spindle 22 is provided, any work machining pattern can be adopted, whereby machining efficiency can be improved.

In the above-mentioned embodiments, although an explanation was made on the assumption that the first tool rest 5, the second tool rest 6 and the third tool rest 7 are each a comb-like tool rest, a turret-shaped tool rest may be used.

In addition, instead of one of or both of the first main spindle 12 and the third main spindle 32, a work conveyance apparatus such as a robot arm and a loader may be provided.

The present invention can be widely applied to a multi-spindle work machining apparatus in which a plurality of machining are conducted on a single piece of work.

EXPLANATION OF SYMBOLS

1: First main spindle
10: Base table
11: First spindle head

12: First main spindle
13: Movable table
13a: Z-direction guide
14: Motor
2: Second main spindle
20: Base table
21: Main spindle head
22: Second main spindle (movable main spindle)
23: Movable table
23a: Z-direction guide
23b: Carriage
24: Motor
25: Saddle
25a: Y-direction guide
3: Third main spindle
30: Base table
31: Main spindle head
32: Third main spindle
33: Movable table
33a: Z-direction guide
34: Motor
4: Bed
5: First tool rest
51: Tool rest main body
52: X-direction guide
53: Saddle
54: Y-direction guide
6: Second tool rest
61: Tool rest main body
62: X-direction guide
63: Saddle
64: Y-direction guide
7: Third tool rest
71: Tool rest main body
72: X direction guide
73: Saddle
74: Y-direction guide
8: Fourth tool rest
81: Tool rest main body
82: Z-direction guide
83: Saddle
84: Y-direction guide
91, 92, 93 and 94: Work conveyance apparatus
T: Tool
W: Work
MU1: First machining unit
MU2: Second machining unit
MU3: Third machining unit

The invention claimed is:

1. A method for machining a work in a work machining apparatus, the work machining apparatus comprising:
a movable main spindle moving between a work supply position and a work take-out position,
a first main spindle,
a second main spindle,
a first work conveyance apparatus for transferring the work, and
a second work conveyance apparatus for transferring the work,
the work being able to be rotationally supported by any of the movable main spindle, the first main spindle, and the second main spindle,
the work machining apparatus being configured to be capable of transferring the work from the first main spindle to the movable main spindle, and from the movable main spindle to the second main spindle,
the method comprising:
arranging a tool rest on the movable main spindle to move integrally with the movable main spindle,
arranging, at the work supply position, either (i) the first work conveyance apparatus for transferring the work or (ii) the first main spindle,
arranging, at the work take-out position, either (i) the second work conveyance apparatus for transferring the work or (ii) the second main spindle,
supplying, at the work supply position and to the movable main spindle, the work either transferred by the first work conveyance apparatus or supported by the first main spindle,
moving the movable main spindle from the work supply position toward the work take-out position,
while moving the movable main spindle from the work supply position toward the work take-out position, machining the work held at the movable spindle with a tool of the tool rest, and
at the work take-out position, taking out the work machined by the movable main spindle from the movable main spindle via either the second work conveyance apparatus or the second main spindle.

2. The method for machining a work according to claim 1, further comprising:
supplying, at the work supply position, another work to either the first main spindle or the first work conveyance apparatus while transferring the work from the movable main spindle to either the second work conveyance apparatus or the second main spindle at the work take-out position.

3. The method for machining a work according to claim 2, wherein the first or second work conveyance apparatus is a robot arm or a loader.

4. A method for machining a work in a work machining apparatus provided with a movable main spindle moving between a work supply position and a work take-out position, the method comprising:
arranging a tool rest on the movable main spindle to move integrally with the movable main spindle,
disposing a first main spindle at the work supply position and a second main spindle at the work take-out position,
machining the work held at the first main spindle at the work supply position,
transferring the work from the first main spindle to the movable main spindle at the work supply position,
machining the work held at the movable main spindle with a tool of the tool rest,
moving the movable main spindle from the work supply position toward the work take-out position while machining the work held at the movable main spindle,
transferring the work from the movable main spindle to the second main spindle at the work take-out position, and
machining the work held at the second main spindle at the work take-out position.

5. The method for machining a work according to claim 4, further comprising:
supplying another work to the first main spindle at the work supply position while transferring the work from the movable main spindle to the second main spindle at the work take-out position, and
machining said another work held at the first main spindle at the work supply position while machining the work held at the second main spindle at the work take-out position.

6. The method for machining a work according to claim 5, further comprising:
   arranging a movable tool rest between the work supply position and the work take-out position,
   machining the work held at the second main spindle with the movable tool rest at the work take-out position, and
   moving the movable tool rest towards the work supply position when the movable main spindle is moving towards the work take-out position.

* * * * *